US007921701B2

(12) United States Patent
Cinpinski et al.

(10) Patent No.: US 7,921,701 B2
(45) Date of Patent: Apr. 12, 2011

(54) DIAGNOSTIC SYSTEMS AND METHODS FOR VARIABLE LIFT MECHANISMS OF ENGINE SYSTEMS HAVING A CAMSHAFT DRIVEN FUEL PUMP

(75) Inventors: Kenneth J. Cinpinski, Ray, MI (US); Donovan L. Dibble, Utica, MI (US)

(73) Assignee: GM Global Technology Operations LLC

( * ) Notice: Subject to any disclaimer, the term of this patent is extended or adjusted under 35 U.S.C. 154(b) by 106 days.

(21) Appl. No.: 12/429,769

(22) Filed: Apr. 24, 2009

(65) Prior Publication Data

US 2010/0269575 A1 Oct. 28, 2010

(51) Int. Cl.
*G01M 15/04* (2006.01)

(52) U.S. Cl. ................ 73/114.41; 73/114.43; 73/114.79

(58) Field of Classification Search ............... 73/114.79, 73/114.41, 114.43
See application file for complete search history.

(56) References Cited

U.S. PATENT DOCUMENTS 5,537,961 A * 7/1996 Shigeru et al. ............ 123/90.15
6,196,174 B1 * 3/2001 Wada et al. ................ 123/90.15
6,885,976 B2 * 4/2005 Yoshiki et al. ................ 702/185
7,063,057 B1 * 6/2006 Waters et al. .............. 123/90.16
7,077,082 B2 * 7/2006 Bloms et al. ............... 123/90.12
7,228,828 B2 * 6/2007 Kagy et al. ................. 123/90.15
7,246,583 B2 * 7/2007 Cinpinski et al. .......... 123/90.27
7,343,887 B2 * 3/2008 Soejima ..................... 123/90.15
7,698,935 B2 * 4/2010 Dibble et al. .............. 73/114.79
7,770,562 B2 * 8/2010 Pursifull et al. .............. 123/446
7,783,413 B2 * 8/2010 Cinpinski et al. ............. 701/105
2003/0213445 A1 * 11/2003 Bloms et al. ............... 123/90.12
2007/0068474 A1 * 3/2007 Cinpinski et al. .......... 123/90.17
2007/0101959 A1 * 5/2007 Soejima ..................... 123/90.17
2009/0222196 A1 * 9/2009 Cinpinski et al. ............. 701/105
2010/0024789 A1 * 2/2010 Lippa et al. ................... 123/672

OTHER PUBLICATIONS

U.S. Appl. No. 11/943,884, filed Nov. 21, 2007, Dibble et al.

* cited by examiner

*Primary Examiner* — Freddie Kirkland, III

(57) ABSTRACT

A lift mechanism diagnostic system comprises a fuel pump disabling module, a pressure module, and a diagnostic module. The fuel pump disabling module selectively disables a fuel pump that is driven by a camshaft. The pressure module determines a first pressure of fluid provided to a variable valve lift mechanism when the variable valve lift mechanism is operated in a first lift mode while the fuel pump is disabled and determines a second pressure of the fluid when the variable valve lift mechanism is operated in a second lift mode while the fuel pump is disabled. The diagnostic module selectively diagnoses a fault in the variable valve lift mechanism based on the first and second pressures.

20 Claims, 4 Drawing Sheets

DIAGNOSTIC SYSTEMS AND METHODS FOR VARIABLE LIFT MECHANISMS OF ENGINE SYSTEMS HAVING A CAMSHAFT DRIVEN FUEL PUMP

CROSS-REFERENCE TO RELATED APPLICATIONS

This application is related to U.S. patent application Ser. No. 11/943,884, filed on Nov. 21, 2007. The disclosure of the above application is incorporated herein by reference in its entirety.

FIELD

The present disclosure relates to internal combustion engines and more particularly to variable lift valve actuation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an internal combustion engine that generates drive torque. More specifically, an intake valve is selectively opened to draw air into cylinders of the engine. The air mixes with fuel to form an air/fuel mixture that is combusted within the cylinders. The air/fuel mixture is compressed and combusted to drive pistons within the cylinders. An exhaust valve selectively opens to allow the exhaust gas resulting from combustion to exit the cylinders.

A rotating camshaft regulates the opening and closing of the intake and/or exhaust valves. The camshaft includes cam lobes that are fixed to and rotate with the camshaft. The geometric profile of a cam lobe determines a valve lift schedule. More specifically, the geometric profile of a cam lobe controls the period that the valve is open (duration) and the magnitude or degree to which the valve opens (lift).

Variable valve actuation (VVA) technology improves fuel economy, engine efficiency, and/or performance by modifying a valve lift event, timing, and duration as a function of engine operating conditions. Two-step VVA systems include variable valve lift mechanisms, such as hydraulically-controlled, switchable roller finger followers (SRFFs). A SRFF associated with a valve (e.g., the intake or exhaust valves) allows the valve to be opened in two discrete lift states: a low lift state and a high lift state.

A control module selectively transitions the SRFF mechanism between the high and low lift states based on demanded engine speed and load. In other words, the control module controls which camshaft lobe will contact the SRFF mechanism and control opening and closing of the associated valve. For example, the control module may transition the SRFF mechanism to the high lift state when the engine speed is greater than a predetermined speed, such as approximately 4,000 revolutions per minute (rpm). Operating in the high lift state under such conditions may aid in avoiding potential hardware damage.

SUMMARY

A lift mechanism diagnostic system comprises a fuel pump disabling module, a pressure module, and a diagnostic module. The fuel pump disabling module selectively disables a fuel pump that is driven by a camshaft. The pressure module determines a first pressure of fluid provided to a variable valve lift mechanism when the variable valve lift mechanism is operated in a first lift mode while the fuel pump is disabled and determines a second pressure of the fluid when the variable valve lift mechanism is operated in a second lift mode while the fuel pump is disabled. The diagnostic module selectively diagnoses a fault in the variable valve lift mechanism based on the first and second pressures.

In other features, the pressure module determines respective first and second pressures for each cylinder of an engine including the first and second pressures. The diagnostic module identifies a cylinder that is associated with the variable valve lift mechanism based on the first and second pressures.

In still other features, the diagnostic module selectively diagnoses the fault based on a difference between the first and second pressures.

In further features, the diagnostic module diagnoses the fault when the difference is less than a predetermined pressure.

In still further features, a valve associated with the variable valve lift mechanism opens a first amount when the variable valve lift mechanism operates in the first lift mode and the valve opens a second amount when the variable valve lift mechanism operates in the second lift mode. The second amount is greater than the first amount.

In other features, the pressure module determines the first and second pressures based on averages of pressures of the fluid measured while the variable valve lift mechanism operates in the first and second lift modes, respectively.

In still other features, the lift mechanism diagnostic system further comprises a lift state control module. The lift state control module selectively transitions the variable valve lift mechanism to the second lift mode after the fuel pump is disabled.

In further features, the lift state control module transitions the variable valve lift mechanism to the second lift mode when a rail pressure is within a predetermined range of rail pressures.

In still further features, the lift mechanism diagnostic system further comprises a diagnostic enabling module. The diagnostic enabling module selectively disables the diagnostic module when an engine speed is greater than a predetermined speed.

In other features, the diagnostic enabling module selectively disables the diagnostic module until the variable valve lift mechanism operates in the first lift mode for a predetermined period.

A lift mechanism diagnostic method comprises: selectively disabling a fuel pump that is driven by a camshaft; determining a first pressure of fluid provided to a variable valve lift mechanism when the variable valve lift mechanism is operated in a first lift mode while the fuel pump is disabled; determining a second pressure of the fluid when the variable valve lift mechanism is operated in a second lift mode while the fuel pump is disabled; and selectively diagnosing a fault in the variable valve lift mechanism based on the first and second pressures.

In other features, the lift mechanism diagnostic method further comprises determining respective first and second pressures for each cylinder of an engine including the first and second pressures and identifying a cylinder that is associated with the variable valve lift mechanism based on the first and second pressures.

In still other features, the selectively diagnosing comprises selectively diagnosing the fault based on a difference between the first and second pressures.

In further features, the selectively diagnosing comprises selectively diagnosing the fault when the difference is less than a predetermined pressure.

In still further features, a valve associated with the variable valve lift mechanism opens a first amount when the variable valve lift mechanism operates in the first lift mode and the valve opens a second amount when the variable valve lift mechanism operates in the second lift mode. The second amount is greater than the first amount.

In other features, the lift mechanism diagnostic method further comprises determining the first and second pressures based on averages of pressures of the fluid measured while the variable valve lift mechanism operates in the first and second lift modes, respectively.

In still other features, the lift mechanism diagnostic method further comprises selectively transitioning the variable valve lift mechanism to the second lift mode after the fuel pump is disabled.

In further features, the selectively transitioning comprises transitioning the variable valve lift mechanism to the second lift mode when a rail pressure is within a predetermined range of rail pressures.

In still further features, the lift mechanism diagnostic method further comprises selectively disabling the selectively diagnosing the fault when an engine speed is greater than a predetermined speed.

In other features, the lift mechanism diagnostic method further comprises selectively disabling the selectively diagnosing the fault until the variable valve lift mechanism operates in the first lift mode for a predetermined period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
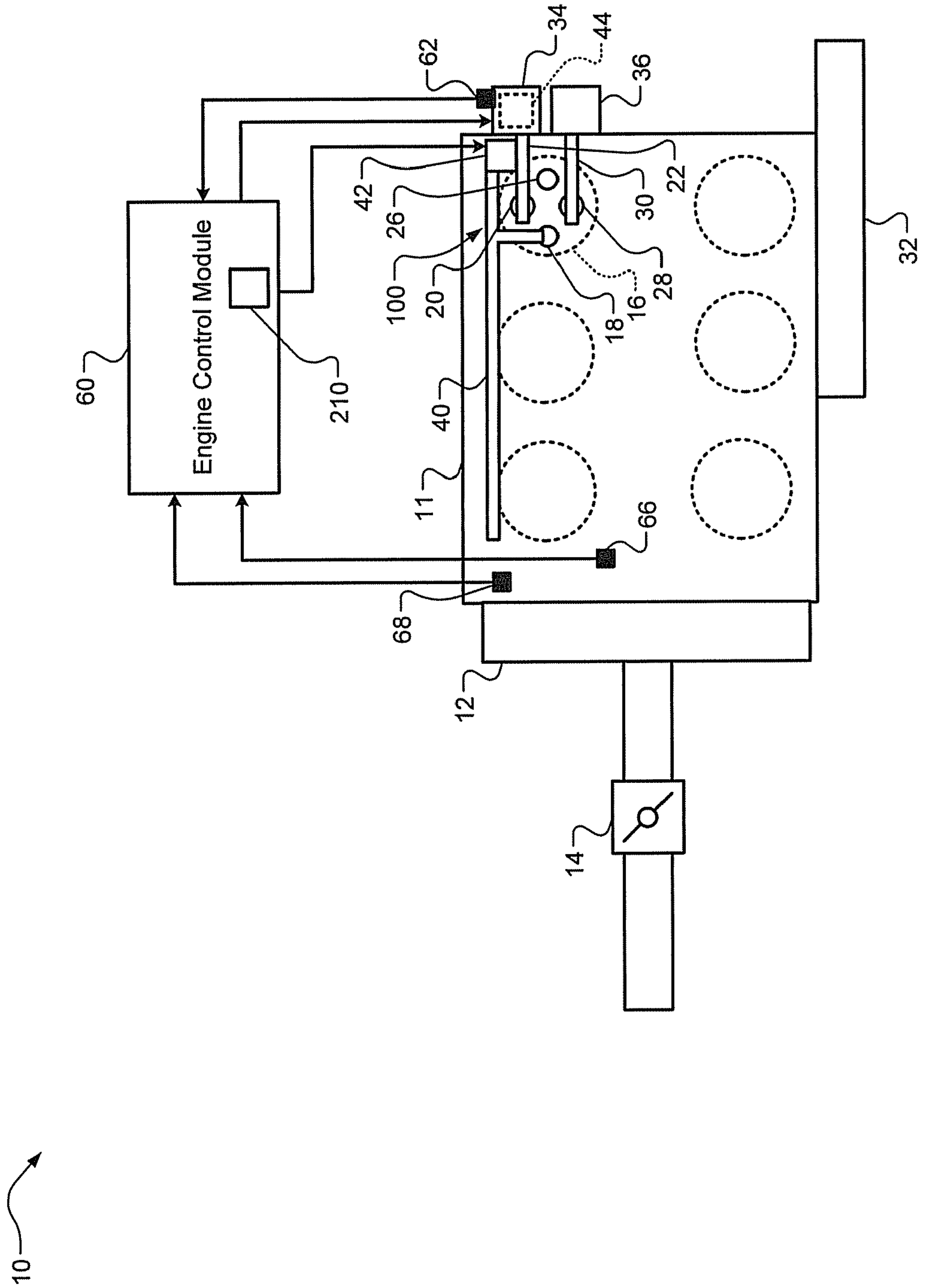
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine controller selectively transitions operation of a variable valve lift mechanism between low and high lift states. When operating in the low lift state, the variable valve lift mechanism controls opening and closing of an associated valve based on a geometric profile of a low lift cam lobe that rotates with a camshaft. When operating in the high lift state, the variable valve lift mechanism controls the opening and closing of the valve based on a geometric profile of a high lift cam lobe that rotates with the camshaft.

A lift mechanism diagnostic system and method involves diagnosing a fault in the variable lift mechanism associated with the valve based on pressure of fluid provided to the variable valve lift mechanism. Operation of a fuel pump that is driven by the camshaft, however, causes fluctuations in the fluid pressure. These fluctuations may cause an incorrect diagnosis of a fault and/or prevent a fault from being diagnosed. The lift mechanism diagnostic system and method selectively disables the fuel pump and diagnoses fault based on pressures measured while the fuel pump is disabled.

Referring now to FIG. 1, a functional block diagram of an exemplary engine system 10 is presented. The engine system 10 includes an engine 11 that combusts an air/fuel mixture to produce drive torque for a vehicle. Air is drawn into an intake manifold 12 through a throttle 14. The throttle 14 regulates air flow into the intake manifold 12. Air within the intake manifold 12 is drawn into cylinders of the engine 11, such as cylinder 16. While the engine 11 is shown as including six cylinders, the engine 11 may include a greater or fewer number of cylinders including, but not limited to, 1, 2, 3, 4, 5, 8, 10, 12, or 16 cylinders.

A fuel injector 18 injects fuel that mixes with air to form an air/fuel mixture. In various implementations, one fuel injector may be provided for each of the cylinders. The fuel injectors may be associated with an electronic or mechanical fuel injection system, a jet or port of a carburetor, or another system for providing fuel. The fuel injectors are controlled to provide a desired air/fuel mixture for combustion, such as a stoichiometric air/fuel mixture.

An intake valve 20 opens and closes to allow air into the cylinder 16. The intake valve position is regulated by an intake camshaft 22. A piston (not shown) compresses the air/fuel mixture within the cylinder 16. A spark plug 26 initiates combustion of the air/fuel mixture. In other types of engine systems, such as diesel engine systems, combustion may be initiated without the spark plug 26. Combustion of the air/fuel mixture applies force to the piston, which rotatably drives a crankshaft (not shown).

Exhaust produced by combustion is forced out of the cylinder 16 via an exhaust valve 28. Opening and closing of the exhaust valve 28 is controlled by an exhaust camshaft 30. The exhaust is expelled from the cylinders to an exhaust system 32. The exhaust system 32 treats the exhaust before the exhaust is expelled from the vehicle. Although only one intake and exhaust valve have been described as being associated with the cylinder 16, more than one intake and/or exhaust valve may be provided for each of the cylinders.

An intake cam phaser 34 and an exhaust cam phaser 36 regulate rotation of the intake and exhaust camshafts 22 and 30, respectively. More specifically, the intake and exhaust cam phasers 34 and 36 control the timing or phase angle of the intake and exhaust camshafts 22 and 30, respectively. For example only, the intake and/or exhaust cam phasers 34 and 36 may retard or advance rotation of the intake and/or exhaust camshafts 22 and 30, respectively, with respect to each other, with respect to a position of the piston within the cylinder 16, or with respect to the crankshaft.

In this manner, the intake and exhaust cam phasers 34 and 36 control the position of the intake and exhaust valves 20 and 28, respectively. By regulating the position of the intake valve 20 and/or the exhaust valve 28, the intake and exhaust cam phasers 34 and 36 control the quantity and characteristics of the air/fuel mixture within cylinder 16 and the torque output of the engine 11.

Pressurized fuel is provided to the fuel injectors via a fuel rail or fuel line 40. A fuel pump 42 selectively pressurizes fuel within the fuel rail 40 based on rotation of a camshaft, such as the intake camshaft 22. More specifically, a fuel pump cam lobe (discussed further below) of the intake camshaft 22 operates the fuel pump 42 to pressurize fuel within the fuel rail 40. The fuel pump 42 may be, for example, a high pressure fuel pump. A low pressure fuel pump (not shown) may be implemented to provide the fuel to the fuel pump 42 from a fuel tank (not shown).

The intake cam phaser 34 may include a phaser actuator 44, which may be electrically or hydraulically actuated. Hydraulically actuated phaser actuators, for example, include an electrically-controlled fluid control valve that controls pressure of fluid (e.g., oil) supplied to the phaser actuator 44. In this manner, the fluid control valve controls pressure of fluid supplied to the intake cam phaser 34 and the phaser actuator 44. The phaser actuator 44 and/or another phaser actuator (not shown) may supply fluid to other valves of the engine 11.

Figure 2:
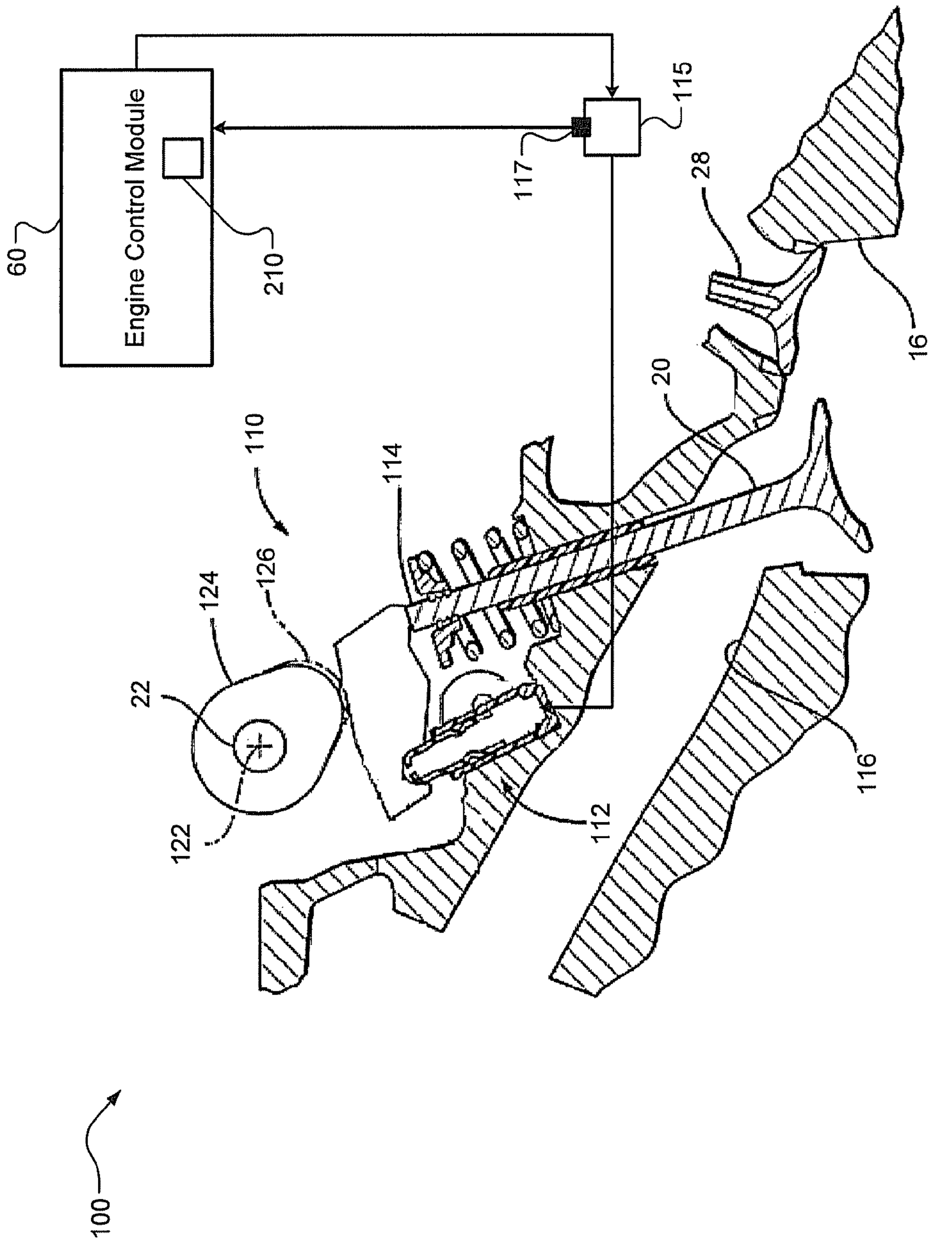
FIG. 2 is a cross sectional view of an intake valve system according to the principles of the present disclosure and a flowchart depicting an exemplary fluid supply system for the intake valve system.

FIG. 2 shows a cross sectional view of an exemplary intake valve system 100. FIG. 2 also includes a flowchart depicting an exemplary fluid supply system for the intake valve system 100. The intake valve system 100 includes a variable valve lift mechanism 110, such as a switching roller finger follower (SRFF). While the variable valve lift mechanism 110 is shown and will be discussed as a SRFF, the variable valve lift mechanism 110 may include other types of valve lift mechanisms that enable an associated valve to be lifted to more than one lift position. Further, while the SRFF mechanism 110 is shown and will be discussed as being associated with the intake valve 20, the SRFF mechanism 110 or another SRFF may be implemented similarly for the exhaust valve 28 or another valve. For example only, one SRFF mechanism may be provided for each valve of a cylinder.

The SRFF mechanism 110 is pivotally mounted on a hydraulic lash adjuster 112, and the SRFF mechanism 110 contacts a valve stem 114 of the intake valve 20. A fluid control valve 115 supplies fluid (e.g., oil) to the hydraulic lash adjuster 112 and the SRFF mechanism 110. A fluid pressure sensor 117 measures pressure of the fluid and generates a fluid pressure signal accordingly.

The intake camshaft 22 rotates about a camshaft axis 122. Low lift cam lobes (e.g., low lift cam lobe 124) and high lift cam lobes (e.g., high lift cam lobe 126) are mounted to the intake camshaft 22. For example, one low lift cam lobe and one high lift cam lobe may be provided for each valve of a cylinder. The low and high lift cam lobes 124 and 126 rotate with the intake camshaft 22. The fuel pump cam lobe (not shown) also rotates with the intake camshaft 22.

The intake valve 20 selectively opens and closes an inlet passage 116 through which air flows to the cylinder 16. The intake valve 20 is selectively lifted (i.e., opened) and lowered (i.e., closed) via the intake camshaft 22. More specifically, the intake valve 20 is opened and closed by the low and/or high lift cam lobes 124 and 126. A biasing device (not shown) applies force to the SRFF mechanism 110 and maintains the SRFF mechanism 110 in operative contact with the low and high lift cam lobes 124 and 126.

The fluid pressure measured by the pressure sensor 117 changes due to opening and closing of the intake valve 20. These pressure changes may be attributable to, for example, a change in height of the intake valve 20 as the SRFF mechanism 110 pivots.

The SRFF mechanism 110 allows the intake valve 20 to be lifted (i.e., opened) to two different positions, a low lift position and high lift position. During low lift operation, the low lift cam lobe 124 causes the SRFF mechanism 110 to pivot to a low lift position in accordance with the geometry of the low lift cam lobe 124. The pivoting of the SRFF mechanism 110 caused by the low lift cam lobe 124 opens the intake valve 20 a first predetermined amount.

During high lift operation, the high lift cam lobe 126 causes the SRFF mechanism 110 to pivot to a high lift position in accordance with the geometry of the high lift cam lobe 126. The pivoting of the SRFF mechanism 110 caused by the high lift cam lobe 126 opens the intake valve 20 a second predetermined amount that is greater than the first predetermined amount.

The pressure of the fluid supplied by the fluid control valve 115 controls which one of the low lift cam lobe 124 and the high lift cam lobe 126 opens and closes the intake valve 20. In this manner, the fluid control valve 115 controls the mode of operation of the SRFF mechanism 110. For example only, the fluid control valve 115 may supply fluid at a lower predetermined pressure (e.g., approximately 10 psi) and a higher predetermined pressure (e.g., approximately 25 psi) to open and close the intake valve 20 using the low and high lift cam lobes 124 and 126, respectively. In other words, the fluid control valve 115 supplies fluid at the low and high predetermined pressures to operate the SRFF mechanism 110 in the low and high lift modes, respectively.

An engine control module (ECM) 60 controls operation of the fuel pump 42, the intake and exhaust cam phasers 34 and 36, the phaser actuator 44, and the fluid control valve 115. The ECM 60 also controls other engine parameters, such as opening of the throttle 14, amount of fuel injected, timing of fuel injection, spark timing, and/or other engine parameters.

A position sensor 62 measures a position of the intake cam phaser 34 and outputs a cam position signal accordingly. An engine speed sensor 66 measures rotational speed of the engine 11 and generates an engine speed signal accordingly. For example only, the engine speed sensor 66 may measure the engine speed based on rotation of the crankshaft. One or more other sensors 68 may also be implemented in the engine system 10.

The ECM 60 includes a processor and memory such as random access memory (RAM), read-only memory (ROM), and/or other suitable electronic storage. The ECM 60 receives the parameters measured by the position sensor 62, the pressure sensor 117, and the engine speed sensor 66. The ECM 60 may also receive parameters measured by the other sensors 68, such as oxygen in the exhaust system 32, engine coolant temperature, mass airflow, oil temperature, manifold absolute pressure, and/or other engine parameters. The ECM 60 selectively makes control decisions for the engine system 10 based on received parameters.

The ECM 60 includes a lift mechanism diagnostic module 210 (See FIG. 3) that selectively diagnoses a fault in a SRFF mechanism of the engine 11. The lift mechanism diagnostic module 210 also identifies the cylinders of the engine 11 with which a faulty SRFF mechanism is associated. If a fault is diagnosed in a SRFF mechanism, the lift mechanism diagnostic module 210 may take remedial action, such as limiting the engine speed, setting a diagnostic flag, and/or illuminating a predetermined light, such as a malfunction indicator light (MIL). Remedial actions such as limiting the engine speed when a fault is diagnosed in a SRFF mechanism may mitigate or prevent engine component damage.

Figure 3:
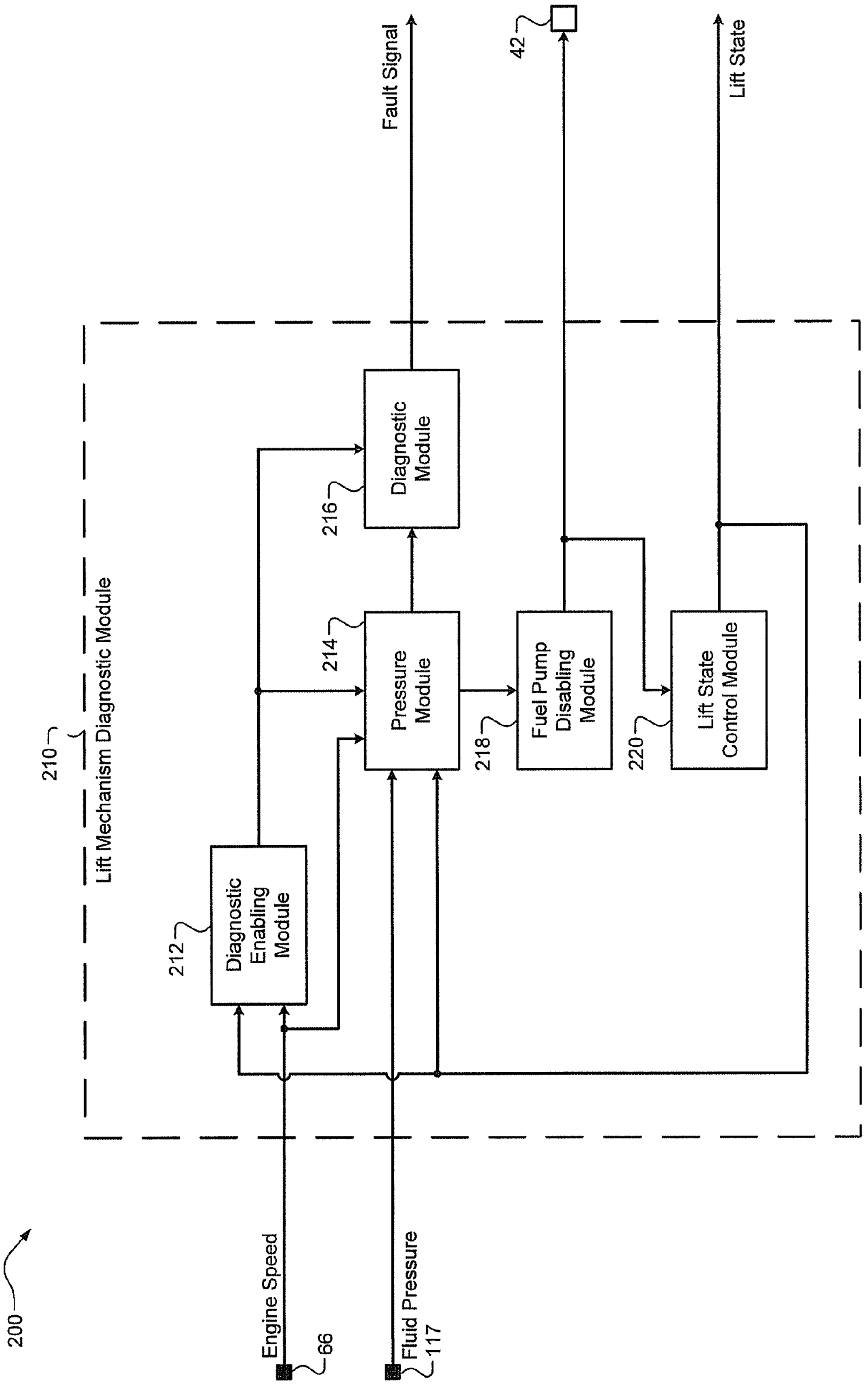
FIG. 3 is a functional block diagram of an exemplary lift mechanism fault diagnostic system according to the principles of the present disclosure.

Referring now to FIG. 3, a functional block diagram of an exemplary implementation of a lift mechanism diagnostic system 200 is presented. The lift mechanism diagnostic module 210 includes a diagnostic enabling module 212, a pressure module 214, and a diagnostic module 216. The lift mechanism diagnostic module 210 also includes a fuel pump disabling module 218 and a lift state control module 220.

The diagnostic enabling module 212 selectively enables the diagnostic module 216 when various enabling conditions are satisfied. The enabling conditions may include, for example, ensuring that the engine speed is less than a predetermined engine speed (e.g., approximately 2000 rpm) and that the SRFF mechanisms are in steady-state. The operation of the SRFF mechanisms may be deemed in steady-state after operating in the low lift state for a predetermined period. The diagnostic enabling module 212 enables the diagnostic module 216 when the enabling conditions are satisfied. In other words, the diagnostic enabling module 212 disables the diagnostic module 216 when one or more of the enabling conditions are not satisfied.

The pressure module 214 communicates with the pressure sensor 117 and the diagnostic module 216. The pressure module 214 monitors pressure variations in the fluid provided by the fluid control valve 115 that occur while opening and closing of each of the valves (i.e., operation the SRFF mechanisms) associated with the intake camshaft 22. The present disclosure is also applicable to valves associated with other camshafts, such as the exhaust valves and the exhaust camshaft 30.

The pressure module 214 determines an average low lift pressure value for each of the cylinders based on input received from the pressure sensor 117 during low lift operation. The average low lift pressure value of a cylinder may be determined based on the fluid pressures measured when a valve of that cylinder is actuated during low lift operation. For example only, the average low lift pressure values are determined over a predetermined number of engine cycles or revolutions of the engine 11 (e.g., 8).

The fuel pump disabling module 218 selectively disables the fuel pump 42 before the low and/or high lift pressure data is captured. For example only, in engine systems where the fuel pump cam lobe is aligned with or approximately aligned with one or more of the high lift cam lobes, the fuel pump disabling module 218 disables the fuel pump 42 before the high lift pressure data is captured. In this manner, high lift pressure data may be captured without being skewed by operation of the fuel pump 42. The fuel pump disabling module 218 may also verify that the rail pressure is within a range of predetermined pressures before disabling the fuel pump 42.

The present disclosure is also applicable to engine systems where the fuel pump cam lobe is aligned with or approximately aligned with a low lift cam lobe. In engine systems where the fuel pump cam lobe is aligned with or approximately aligned with a low lift cam lobe, the fuel pump disabling module 218 may disable the fuel pump 42 before the low lift pressure data is captured.

The lift state control module 220 controls the lift state of the intake valve 20. More specifically, the lift state control module 220 controls whether the SRFF mechanism 110 operates in low lift operation or high lift operation. The lift state control module 220 transitions the SRFF mechanism 110 to high lift operation after the low lift data has been captured. In this manner, the high lift lobes then control lift and duration of opening of the associated valves. In other implementations, the lift mechanism diagnostic system 200 may transition from high lift operation to low lift operation.

The pressure module 214 determines an average high lift pressure value for each of the cylinders based on input received from the pressure sensor 117 during high lift operation. In various implementations, the pressure module 214 may wait a predetermined period (e.g., 4 engine cycles or revolutions of the engine 11) to ensure that the SRFF mechanisms have ample time to properly transition to the high lift state.

The average high lift pressure value of a cylinder may be determined based on fluid pressures measured when a valve of that cylinder is actuated during high lift operation. For example only, the average high lift pressure values are determined over a predetermined number (e.g., 8) of engine cycles or revolutions of the engine 11. Once the average high lift pressure values have been determined, the fuel pump disabling module 218 may re-enable the fuel pump 42.

The pressure module 214 correlates the pressure data captured for each cylinder, determines a pressure difference for each cylinder, and provides the pressure differences to the diagnostic module 216. More specifically, the pressure module 214 correlates the average low lift pressure value of a cylinder with the average high lift pressure value of that cylinder. The pressure module 214 determines a pressure difference for the cylinder based on, for example, a magnitude of a difference between the average low and high lift pressure values for that cylinder. The pressure module 214 provides the pressure differences for each of the cylinders to the diagnostic module 216.

The diagnostic module 216 selectively diagnoses a fault in a SRFF mechanism based on the pressure difference of the cylinder with which the SRFF mechanism is associated. For example, the diagnostic module 216 selectively diagnoses a fault in the SRFF mechanism 110 based on the pressure difference of the cylinder 16. The diagnostic module 216 may diagnose a fault in the SRFF mechanism 110 based on a comparison of the pressure difference with a predetermined pressure, such as approximately 2.5 pounds per square inch (psi). For example only, the diagnostic module 216 may diagnose a fault when the pressure difference is less than the predetermined pressure.

The diagnostic module 216 generates a fault signal based on the diagnosis. The fault signal may include data identifying that a fault has occurred and data identifying the cylinder associated with the faulty SRFF mechanism. In other words, the diagnostic module 216 identifies a cylinder associated with a SRFF mechanism that has failed to transition between lift states. The ECM 60 and/or another module or system may command remedial action based on the fault signal.

Figure 4:
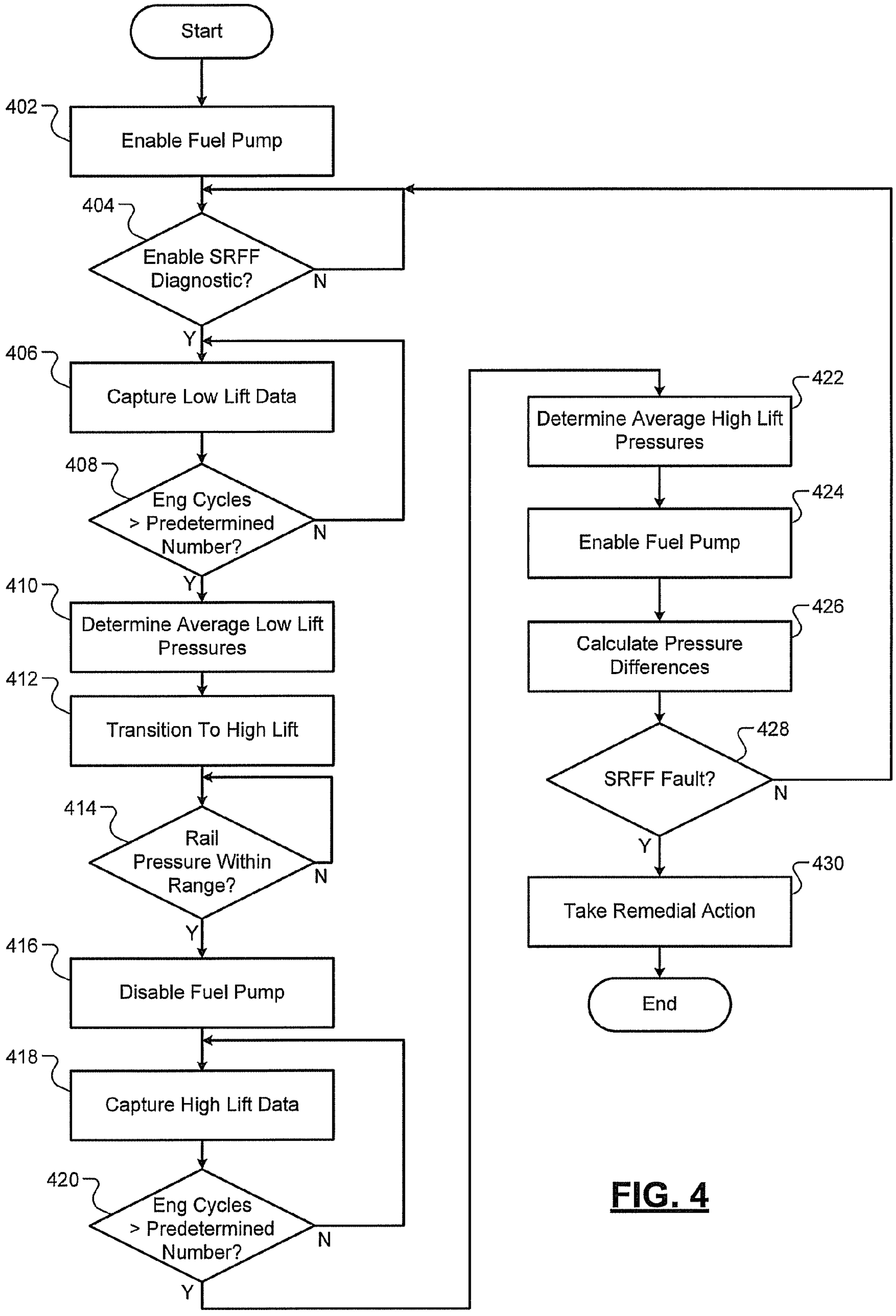
FIG. 4 is a flowchart depicting exemplary steps performed by a lift mechanism fault diagnostic module according to the principles of the present disclosure.

Referring now to FIG. 4, a flowchart depicting exemplary steps performed by the lift mechanism diagnostic module 210 is presented. Control begins in step 402 where control enables the fuel pump 42. The fuel pump 42 pressurizes fuel in the fuel rail 40 based on the fuel pump lobe of the intake camshaft 22.

Control continues to step 404 where control determines whether to enable the SRFF diagnostic. If true, control continues to step 406. If false, control remains in step 404. Control may enable the SRFF diagnostic when the engine speed is less than a predetermined speed and the intake camshaft 22 is in steady-state operation.

In step 406, control captures low lift data. In other words, control obtains the fluid pressures for each valve during low lift operation. Control determines whether the number of engine cycles completed (or revolutions of the engine 11) is greater than a predetermined number in step 408. If true, control continues to step 410. If false, control returns to step 406. The predetermined number may be calibratable and may be set to, for example, 8.0. Accordingly, control captures low lift pressure data for a predetermined number of engine cycles or revolutions of the engine 11 in step 408.

Control determines the average low lift pressure values for each of the SRFF mechanisms and cylinders in step 410. Control transitions to high lift operation in step 412. In step 414, control determines whether the rail pressure is within a predetermined range of pressures. If true, control continues to step 416. If false, control remains in step 414. Control disables the fuel pump 42 in step 416. In other implementations, steps 414 and 416 are performed before the low lift data is captured in step 406. In such implementations, control verifies that the rail pressure is within the predetermined range of pressures and disables the fuel pump 42 before capturing the low lift data.

Control captures high lift data in step 418. In other words, control obtains the fluid pressures for each valve during high lift operation. Control determines whether the number of engine cycles completed (or revolutions of the engine 11) is greater than a predetermined number in step 420. In other words, control determines whether high lift pressure data has been captured over the predetermined number of engine cycles or revolutions of the engine 11 in step 420. If true, control continues to step 422. If false, control returns to step 418. The predetermined number may be calibratable and may be set to, for example, 8.0.

Control determines the average high lift pressure values in step 422. In step 424, control enables the fuel pump 42. Control correlates the average low and high lift pressure values for each cylinder and valve and determines a pressure difference for each cylinder in step 426. The pressure difference for a cylinder or valve may be based on a magnitude of a difference between the average low and high lift pressure values.

Control determines whether a SRFF fault has occurred in step 428. If true, control continues to step 430. If false, control returns to step 404. For example only, control may diagnose a fault in a SRFF mechanism when the pressure difference is less than a predetermined value, such as 2.5 pounds per square inch (psi). Control takes remedial action in step 430 and control ends. Remedial actions taken may include, but are not limited to, limiting the engine speed, setting a diagnostic flag, and/or illuminating a predetermined light, such as a malfunction indicator light (MIL).

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A lift mechanism diagnostic system comprising:

a fuel pump disabling module that selectively disables a fuel pump that is driven by a camshaft;

a pressure module that determines a first pressure of fluid provided to a variable valve lift mechanism when said variable valve lift mechanism is operated in a first lift mode while said fuel pump is disabled and that determines a second pressure of said fluid when said variable valve lift mechanism is operated in a second lift mode while said fuel pump is disabled; and a diagnostic module that selectively diagnoses a fault in said variable valve lift mechanism based on said first and second pressures.

2. The lift mechanism diagnostic system of claim 1 wherein said pressure module determines respective first and second pressures for each cylinder of an engine including said first and second pressures, and wherein said diagnostic module identifies a cylinder that is associated with said variable valve lift mechanism based on said first and second pressures.

3. The lift mechanism diagnostic system of claim 1 wherein said diagnostic module selectively diagnoses said fault based on a difference between said first and second pressures.

4. The lift mechanism diagnostic system of claim 3 wherein said diagnostic module diagnoses said fault when said difference is less than a predetermined pressure.

5. The lift mechanism diagnostic system of claim 1 wherein a valve associated with said variable valve lift mechanism opens a first amount when said variable valve lift mechanism operates in said first lift mode and said valve opens a second amount when said variable valve lift mechanism operates in said second lift mode, and wherein said second amount is greater than said first amount.

6. The lift mechanism diagnostic system of claim 1 wherein said pressure module determines said first and second pressures based on averages of pressures of said fluid measured while said variable valve lift mechanism operates in said first and second lift modes, respectively.

7. The lift mechanism diagnostic system of claim 1 further comprising a lift state control module that selectively transitions said variable valve lift mechanism to said second lift mode after said fuel pump is disabled.

8. The lift mechanism diagnostic system of claim 7 wherein said lift state control module transitions said variable valve lift mechanism to said second lift mode when a rail pressure is within a predetermined range of rail pressures.

9. The lift mechanism diagnostic system of claim 1 further comprising a diagnostic enabling module that selectively disables said diagnostic module when an engine speed is greater than a predetermined speed.

10. The lift mechanism diagnostic system of claim 9 wherein said diagnostic enabling module selectively disables said diagnostic module until said variable valve lift mechanism operates in said first lift mode for a predetermined period.

11. A lift mechanism diagnostic method comprising:

selectively disabling a fuel pump that is driven by a camshaft;

determining a first pressure of fluid provided to a variable valve lift mechanism when said variable valve lift mechanism is operated in a first lift mode while said fuel pump is disabled;

determining a second pressure of said fluid when said variable valve lift mechanism is operated in a second lift mode while said fuel pump is disabled; and selectively diagnosing a fault in said variable valve lift mechanism based on said first and second pressures.

12. The lift mechanism diagnostic method of claim 11 further comprising:

determining respective first and second pressures for each cylinder of an engine including said first and second pressures; and identifying a cylinder that is associated with said variable valve lift mechanism based on said first and second pressures.

13. The lift mechanism diagnostic method of claim 11 wherein said selectively diagnosing comprises selectively diagnosing said fault based on a difference between said first and second pressures.

14. The lift mechanism diagnostic method of claim 13 wherein said selectively diagnosing comprises selectively diagnosing said fault when said difference is less than a predetermined pressure.

15. The lift mechanism diagnostic method of claim 11 wherein a valve associated with said variable valve lift mechanism opens a first amount when said variable valve lift mechanism operates in said first lift mode and said valve opens a second amount when said variable valve lift mechanism operates in said second lift mode, and wherein said second amount is greater than said first amount.

16. The lift mechanism diagnostic method of claim 11 further comprising determining said first and second pressures based on averages of pressures of said fluid measured while said variable valve lift mechanism operates in said first and second lift modes, respectively.

17. The lift mechanism diagnostic method of claim 11 further comprising selectively transitioning said variable valve lift mechanism to said second lift mode after said fuel pump is disabled.

18. The lift mechanism diagnostic method of claim 17 wherein said selectively transitioning comprises transitioning said variable valve lift mechanism to said second lift mode when a rail pressure is within a predetermined range of rail pressures.

19. The lift mechanism diagnostic method of claim 11 further comprising selectively disabling said selectively diagnosing said fault when an engine speed is greater than a predetermined speed.

20. The lift mechanism diagnostic method of claim 19 further comprising selectively disabling said selectively diagnosing said fault until said variable valve lift mechanism operates in said first lift mode for a predetermined period.

* * * * *